United States Patent
Yamaguchi et al.

(10) Patent No.: US 7,201,138 B2
(45) Date of Patent: Apr. 10, 2007

(54) CONTROL SYSTEM FOR INTERNAL COMBUSTION ENGINE

(75) Inventors: Satoshi Yamaguchi, Wako (JP); Mamoru Hasegawa, Wako (JP); Hideki Sakamoto, Wako (JP); Naoto Kitayama, Wako (JP); Akira Odajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/483,648

(22) Filed: Jul. 11, 2006

(65) Prior Publication Data

US 2007/0012289 A1    Jan. 18, 2007

(30) Foreign Application Priority Data

Jul. 14, 2005 (JP) ............................. 2005-205384
Sep. 16, 2005 (JP) ............................. 2005-270106

(51) Int. Cl.
*F02P 5/00* (2006.01)
*F02M 25/07* (2006.01)
*F02D 45/00* (2006.01)

(52) U.S. Cl. .............. 123/305; 123/406.3; 123/406.45; 123/568.11; 123/381

(58) Field of Classification Search ................ 123/305, 123/406.3, 406.32, 406.45, 406.47, 406.48, 123/381, 568.11
See application file for complete search history.

(56) References Cited

U.S. PATENT DOCUMENTS 4,722,310 A    2/1988   Igashira et al.
6,941,929 B2 *  9/2005  Shinzawa ................... 123/357
2004/0177830 A1  9/2004  Yamaoka et al.

FOREIGN PATENT DOCUMENTS

| EP | 0 905 361 A2 | 3/1999 |
| EP | 1 445 456 A2 | 8/2004 |
| JP | 2004-100566 A | 4/2004 |

* cited by examiner

*Primary Examiner*—Hai Huynh
(74) *Attorney, Agent, or Firm*—Arent Fox LLP

(57) ABSTRACT

A control system used with an engine determines a fuel injection timing according to a detected engine operating condition and fuel injection is executed through a fuel injection valve. The target ignition timings of the fuel are set according to the detected engine operating condition and stored in a memory. An ignition delay of the actual ignition timing relative to the target ignition timing and a cetane number of the fuel are calculated. Control values of the recirculation amount of exhaust gases are set according to the detected engine operating condition and stored in the memory. The stored control value is retrieved and the recirculation amount of exhaust gases is controlled using the retrieved control value. A correction amount of the recirculation amount of exhaust gases is calculated according to the estimated cetane number and the recirculation amount of exhaust gases is controlled using the corrected control value.

10 Claims, 8 Drawing Sheets

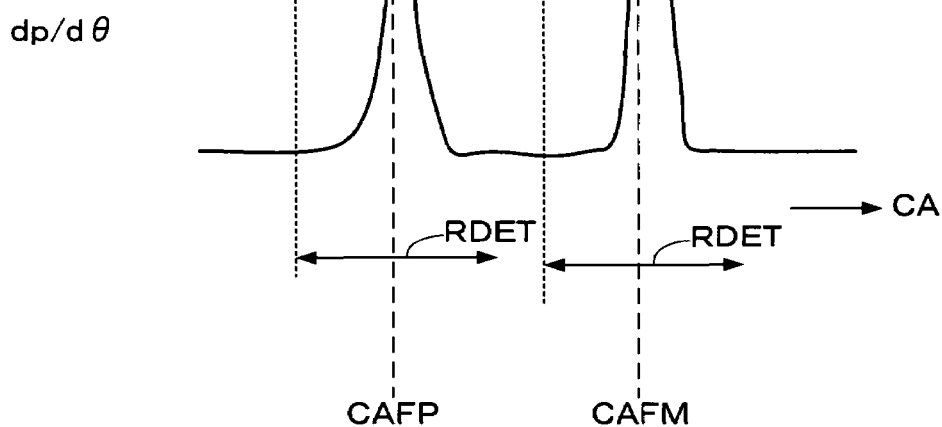
*FIG. 7A* INJP
*FIG. 7B* INJM
*FIG. 7C* dp/dθ
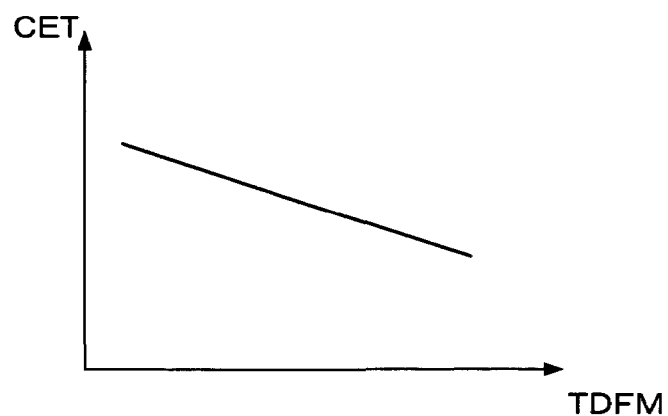
*FIG. 8*

CONTROL SYSTEM FOR INTERNAL COMBUSTION ENGINE

BACKGROUND OF THE INVENTION

1. Field of the Invention

The present invention relates to a control system for an internal combustion engine, and particularly, to a system for controlling an internal combustion engine according to a pressure in the cylinder detected by a cylinder pressure sensor.

2. Description of the Related Art

Japanese Patent Laid-open No. 2004-100566 (JP '566) discloses a fuel injection control apparatus in which the cylinder pressure (pressure in the combustion chamber) is detected by a cylinder pressure sensor. A fuel injection amount, a fuel injection timing, and the like, are controlled according to the detected cylinder pressure. According to the disclosed apparatus, the crank angle Cmax at which the cylinder pressure reaches a maximum value is detected, and the fuel injection timing is corrected so that the detected crank angle Cmax coincides with a target value which is previously set according to the engine operating condition.

If the internal combustion engine is a diesel engine, an actual ignition timing changes depending on the cetane number of the fuel being used, even if the fuel injection timing is the same. Therefore, the control used by the above-described conventional apparatus is effective when the combustion characteristic of the fuel changes.

However, a specific method for correcting the fuel injection timing is not shown in JP '566. For example, if the cylinder pressure is to be detected during comparatively short periods of time and control is to be performed based on the detection results, the calculation load on the control apparatus increases. Accordingly, correction of the fuel injection timing must be performed without excessively increasing the calculation load on the control apparatus. However, the apparatus shown in JP '566 is not configured in contemplation of such a situation.

Further, in an engine having the exhaust gas recirculation mechanism, the combustion state of fuel in the combustion chamber changes due to execution of the exhaust gas recirculation. Therefore, it is desirable to control the amount of exhaust gases being recirculated according to the actual combustion state. However, such a situation is not taken into consideration by the above-described control apparatus.

SUMMARY OF THE INVENTION

The present invention was attained contemplating the above-described points, and an aspect of the present invention is to provide a control system for an internal combustion engine which detects an actual ignition timing of fuel based on the cylinder pressure detected by the cylinder pressure sensor and which appropriately controls the recirculation amount of exhaust gases according to the detected actual ignition timing.

To attain the above-described aspect, the present invention provides a control system for an internal combustion engine having a fuel injection means provided in a combustion chamber of the engine for injecting fuel into the combustion chamber, and an exhaust gas recirculation mechanism for recirculating exhaust gases of the engine to an intake system of the engine. The control system includes operating condition detecting means, fuel injection control means, ignition timing detecting means, cetane number estimating means, exhaust gas recirculation control value storing means, exhaust gas recirculation control means, and correcting means. The operating condition detecting means detects an operating condition of the engine. The fuel injection control means determines a fuel injection timing (CAIM) according to the detected engine operating condition, and executes fuel injection through the fuel injection means. The ignition timing storing means stores target ignition timings (CAFMM) of the fuel being injected into the combustion chamber. The target ignition timings (CAFMM) are set according to the operating condition of the engine. The ignition timing detecting means detects an actual ignition timing (CAFM) of the fuel injected into the combustion chamber. The cetane number estimating means calculates an ignition delay (DCAM) of the actual ignition timing (CAFM) with respect to the target ignition timing (CAFMM), and estimates the cetane number (CETLRN) of the fuel according to the calculated ignition delay (DCAM). The exhaust gas recirculation control value storing means stores control values (GEGRM) of an amount of exhaust gases recirculated through the exhaust gas recirculation mechanism. The control values (GEGRM) are set according to the operating condition of the engine. The exhaust gas recirculation control means retrieves a control value stored in the exhaust gas recirculation control value storing means according to the detected engine operating condition, and controls the recirculation amount of exhaust gases using the retrieved control value (GEGRM). The correcting means calculates a correction amount of the recirculation amount of exhaust gases according to the estimated cetane number (CETLRN), and corrects the control value (GEGRM) retrieved from the exhaust gas recirculation control value storing means. The exhaust gas recirculation control means controls the recirculation amount of exhaust gases using the control value (GEGR) corrected by the correcting means. In the present invention, the "ignition timing" means the compression ignition timing that is a timing of ignition caused not by the spark plug but by the compression of the air-fuel mixture.

With the above-described configuration, the target ignition timing is calculated according to the engine operating condition, the actual ignition timing is detected, and the ignition delay of the actual ignition timing with respect to the target ignition timing is calculated. Further, the cetane number of the fuel is estimated according to the calculated ignition delay, and the control value of the recirculation amount of exhaust gases calculated according to the engine operating condition is corrected according to the estimated cetane number. The recirculation amount of exhaust gases is controlled using the corrected control value. Therefore, the exhaust gas recirculation is appropriately performed according to the cetane number of the fuel being used, wherein a good combustion state and exhaust characteristics are maintained.

Preferably, the correction means stops the correction process when the cetane number estimating means is estimating the cetane number (CETLRN).

With the above-described configuration, correction of the control value of the recirculation amount of exhaust gases is stopped when the cetane number estimating means is estimating the cetane number. Since the fuel may be changed due to refueling, inaccurate correction is prevented by stopping the correction process until estimation of the cetane number of the fuel being used is completed.

Further, another aspect of the present invention is to provide a control system for an internal combustion engine which detects an actual ignition timing of fuel based on the cylinder pressure detected by the cylinder pressure sensor and which appropriately performs correction of the fuel injection timing according to the detected actual ignition timing, wherein any increase in the calculation load is suppressed.

To attain the above-described aspect, the present invention provides a control system for an internal combustion engine having a fuel injection means provided in a combustion chamber of the engine for injecting fuel into the combustion chamber. The control system includes fuel injection timing storing means, operating condition detecting means, fuel injection control means, ignition timing storing means, ignition timing detecting means, cetane number estimating means, ignition delay correction value storing means, and fuel injection timing correction amount calculating means. The fuel injection timing storing means stores fuel injection timings (CAIMM) executed by the fuel injection means. The fuel injection timings (CAIMM) are set according to an operating condition of the engine based on a fuel of a first cetane number (CETH). The operating condition detecting means detects an operating condition of the engine. The fuel injection control means retrieves the fuel injection timing stored in the fuel injection timing storing means according to the detected engine operating condition to determine a fuel injection timing, and executes fuel injection through the fuel injection means. The ignition timing storing means stores target ignition timings (CAFMM) of the fuel injected into the combustion chamber. The target ignition timing (CAFMM) is set according to the operating condition of the engine based on the fuel of the first cetane number (CETH). The ignition timing detecting means detects an actual ignition timing (CAFM) of the fuel injected into the combustion chamber. The cetane number estimating means calculates an ignition delay (DCAM) of the actual ignition timing (CAFM) with respect to the target ignition timing (CAFMM), and estimates the cetane number (CETLRN) of the fuel according to the calculated ignition delay (DCAM). The ignition delay correction value storing means stores ignition delay correction values (CADM) corresponding to a case where fuel of a second cetane number (CET0) is used. The ignition delay correction values (CADM) are set according to the operating condition of the engine. The fuel injection timing correction amount calculating means retrieves the ignition delay correction value stored in the ignition delay correction value storing means according to the detected engine operating condition, and calculates a fuel injection timing correction amount (CAD) based on the retrieved ignition delay correction value (CADM) and the estimated cetane number (CETLRN). The fuel injection control means corrects the fuel injection timing (CAIMM) with the fuel injection timing correction amount (CAD), and executes the fuel injection according to the corrected fuel injection timing (CAIM).

With the above-described configuration, the fuel injection timing is retrieved from the fuel injection timing storing means that stores the fuel injection timings that are set based on the fuel of the first cetane number, and the target ignition timing is retrieved from the ignition timing storing means that stores the target ignition timings that are set based on the fuel of the first cetane number. The actual ignition timing is detected, the ignition delay of the actual ignition timing with respect to the target ignition timing is calculated, and the cetane number of the fuel is estimated according to the calculated ignition delay. Further, the ignition delay correction value for the case using the fuel of the second cetane number is calculated according to the engine operating condition, the fuel injection timing correction amount is calculated based on the ignition delay correction value and the estimated cetane number, and the fuel injection timing is corrected with the fuel injection timing correction amount. The fuel injection is performed according to the corrected fuel injection timing. By previously storing the ignition delay correction values for the case where the fuel of the second cetane number is used, the fuel injection timing correction amount is calculated by correcting the ignition delay correction value according to the estimated cetane number. Therefore, the calculation load on the control system is reduced, which results in improved controllability of the control system.

Preferably, the fuel injection control means stops the correction of the fuel injection timing (CAIMM) when the cetane number estimating means is estimating the cetane number (CETLRN).

With the above-described configuration, correction of the fuel injection timing is stopped when the cetane number estimating means is estimating the cetane number. Since the fuel may be changed due to refueling, inaccurate correction is prevented by stopping the correction process until estimation of the cetane number of the fuel being used is completed.

Further, the present invention provides a control system for an internal combustion engine having fuel injection means provided in a combustion chamber of the engine for injecting fuel into the combustion chamber. The control system includes fuel injection timing storing means, operating condition detecting means, fuel injection control means, ignition timing storing means, ignition timing detecting means, cetane number estimating means, a plurality of ignition delay correction value storing means, and fuel injection timing correction amount calculating means. The fuel injection timing storing means stores timings (CAIMM) of the fuel injection performed by the fuel injection means. The fuel ignition timings (CAIMM) are set according to an operating condition of the engine based on a fuel of a first cetane number (CET1). The operating condition detecting means detects an operating condition of the engine. The fuel injection control means retrieves the fuel injection timing (CAIMM) stored in the fuel injection timing storing means according to the detected engine operating condition (NE, TRQ) to determine a fuel injection timing (CAIM) and executes fuel injection through the fuel injection means. The ignition timing storing means stores target ignition timings (CAFMM) of the fuel injected into the combustion chamber. The target ignition timings (CAFMM) are set according to the operating condition of the engine based on the fuel of the first cetane number (CET1). The ignition timing detecting means detects an actual ignition timing (CAFM) of the fuel injected into the combustion chamber. The cetane number estimating means calculates an ignition delay (DCAM) of the actual ignition timing (CAFM) with respect to the target ignition timing (CAFMM) and estimates the cetane number of the fuel according to the calculated ignition delay (DCAM). A plurality of ignition delay correction value storing means corresponding to fuels of different cetane numbers (CET01, CET02, CET03) store ignition delay correction values (CADM01, CADM02, CADM03) corresponding to a case where a fuel having a cetane number (CET01, CET02, CET03) lower than the first cetane number (CET1) is used. The ignition delay correction values are set according to the operating condition of the engine. The fuel injection timing correction amount calculating means selects one of a plurality of the ignition delay correction value memory means based on the estimated cetane number (CETLRN), retrieves the ignition delay correction value (CADM01, CADM02, CADM03) stored in the selected ignition delay correction value storing means according to the detected engine operating condition, and outputs the retrieved ignition delay correction value as a fuel injection timing correction amount (CAD). The fuel injection control means corrects the fuel injection timing (CAIMM) using the fuel injection timing correction amount (CAD) and executes the fuel injection according to the corrected fuel injection timing (CAIM). When a misfire of the engine is detected, the fuel injection timing correction amount calculating means selects from a plurality of ignition delay correction value storing means the ignition delay correction value storing means that stores ignition delay correction values (CADM01) corresponding to a case where a fuel of the lowest cetane number (CET01) is used.

With the above-described configuration, the fuel injection timing is retrieved from the fuel injection timing storing means that stores fuel injection timings that are set based on the fuel of the first cetane number, and the target ignition timing is retrieved from the ignition timing storing means that stores target ignition timings that are set based on the fuel of the first cetane number. The actual ignition timing is detected, the ignition delay of the actual ignition timing with respect to the target ignition timing is calculated, and the cetane number of the fuel is estimated according to the calculated ignition delay. Further, the ignition delay correction value for the case using a fuel having a cetane number lower than the first cetane number is calculated according to the engine operating condition, the fuel injection timing correction amount is calculated based on the ignition delay correction value and the estimated cetane number, and the fuel injection timing is corrected with the fuel injection timing correction amount. The fuel injection is performed according to the corrected fuel injection timing. The ignition delay correction values for the cases using the fuel of the cetane number lower than the first cetane number are previously stored in a plurality of the ignition timing correction amount storing means. Accordingly, the fuel injection timing correction amount is obtained by selecting one of a plurality of ignition timing correction amount storing means and retrieving the stored value from the selected ignition timing correction amount storing means. Therefore, the calculation load on the control system is reduced, which results in improved controllability of the control system. Further, the ignition delay correction value storing means that stores the ignition delay correction values corresponding to the case using fuel having the lowest cetane number is selected when a misfire of the engine is detected. Therefore, the fuel injection is performed at the best fuel injection timing for preventing a misfire of the engine, thereby preventing the misfire.

BRIEF DESCRIPTION OF THE DRAWINGS

FIGS. 7A–7C are time charts illustrating an ignition timing detection method;

FIG. 8 illustrates a table used for calculating a cetane number (CET) from an ignition delay time period (TDFM);

DETAILED DESCRIPTION OF THE PREFERRED EMBODIMENTS

Preferred embodiments of the present invention will now be described with reference to the drawings.

Figure 1:
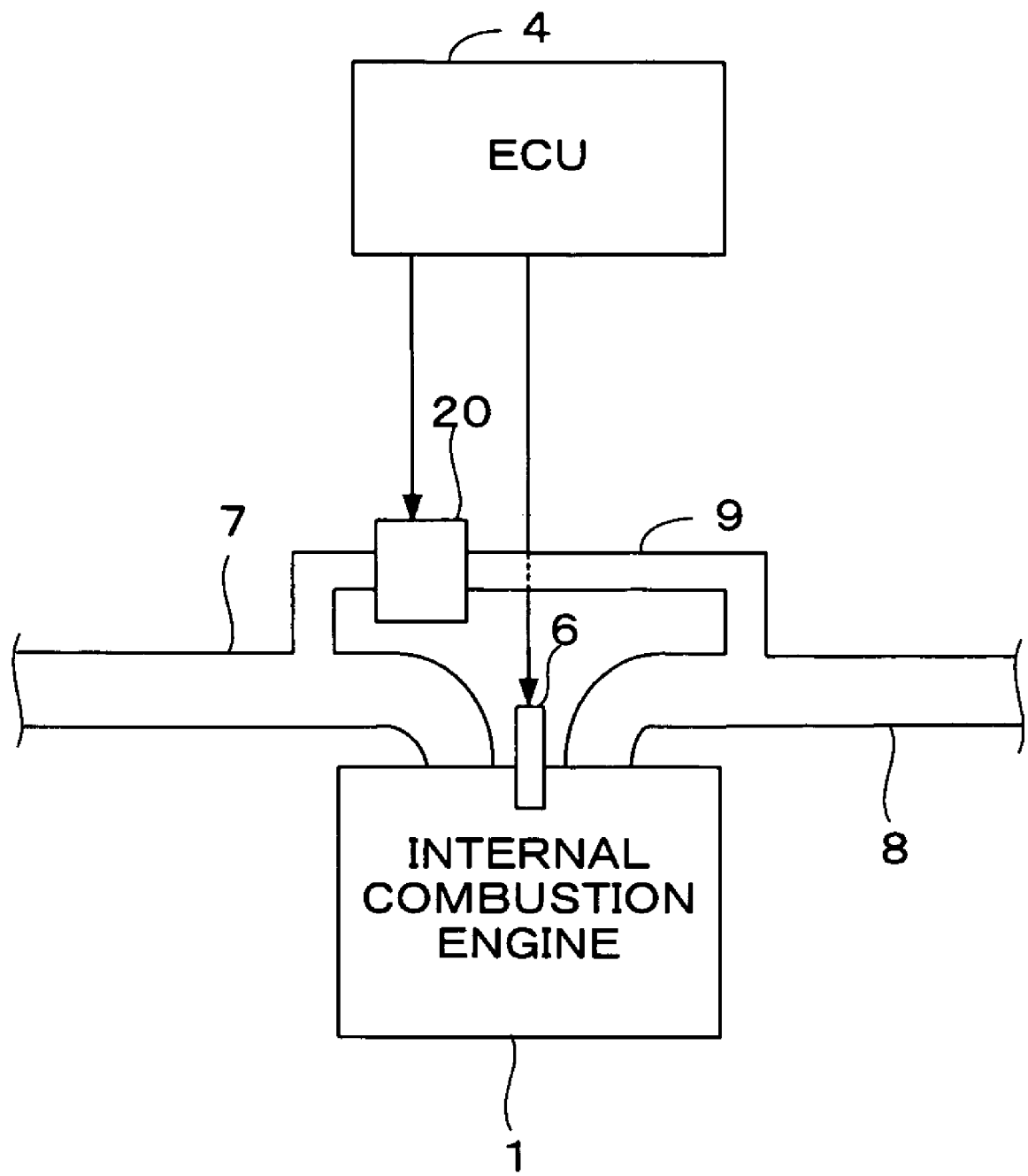
FIG. 1 is a schematic diagram illustrating an internal combustion engine and a control system therefor according to one embodiment of the present invention.
Figure 2:
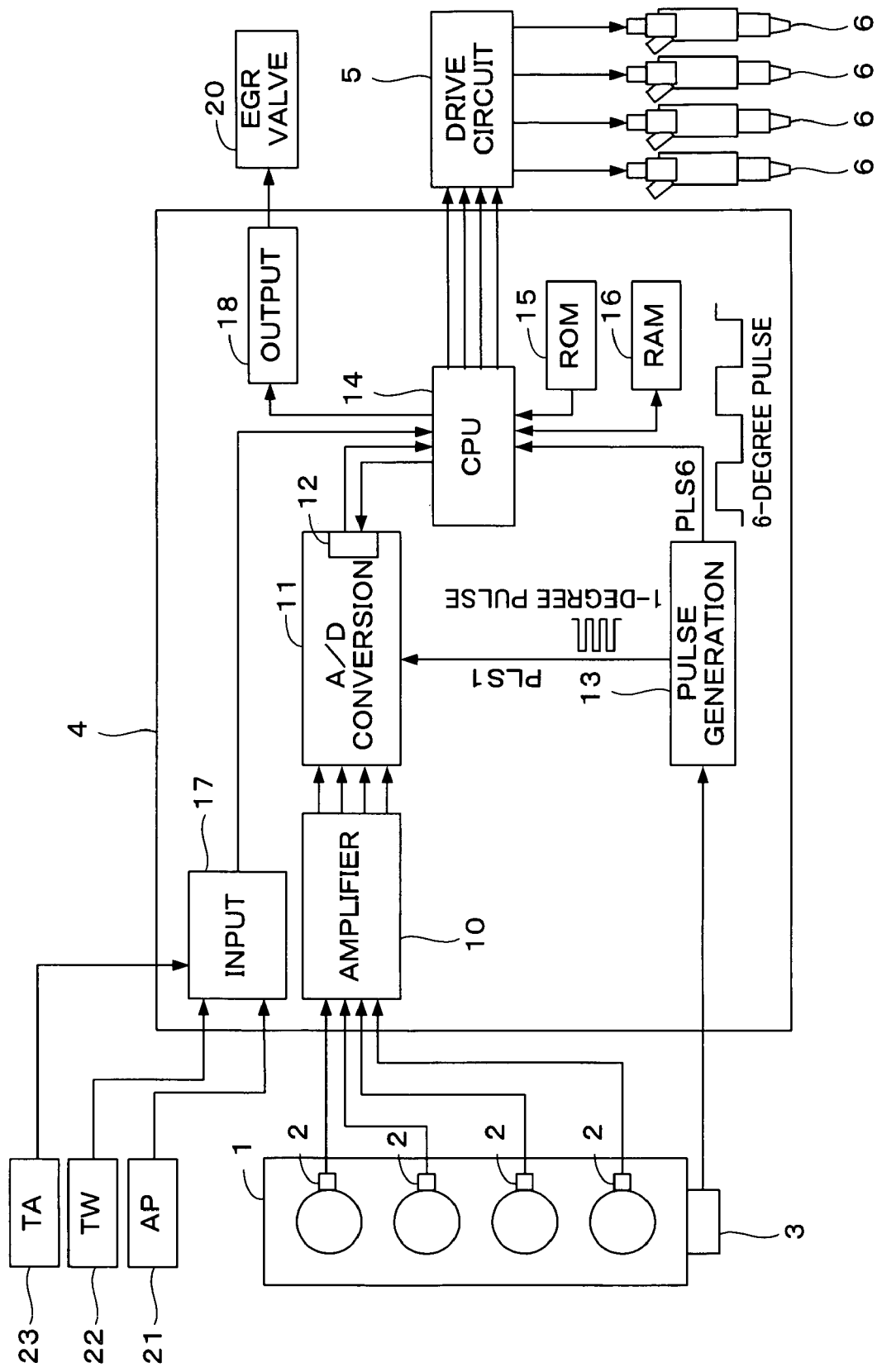
FIG. 2 is a schematic diagram illustrating a configuration of a part of the control system illustrated in FIG. 1.

FIGS. 1 and 2 are schematic diagrams illustrating a configuration of an internal combustion engine 1 and a control system therefor according to one embodiment of the present invention. The internal combustion engine 1 (hereinafter referred to as "engine"), which has four cylinders, is a diesel engine, wherein fuel is injected directly into the cylinders. Each cylinder is provided with a fuel injection valve 6 electrically connected to an electronic control unit 4 (hereinafter referred to as "ECU 4"). The ECU 4 controls a valve opening period and a valve opening timing of each fuel injection valve 6. That is, the fuel injection period and fuel injection timing are controlled by the ECU 4.

The engine 1 has an intake pipe 7 and an exhaust pipe 8. An exhaust gas recirculation passage 9 for recirculating a part of exhaust gases to the intake pipe 7 is provided between the exhaust pipe 8 and the intake pipe 7. The exhaust gas recirculation passage 9 is provided with an exhaust gas recirculation control valve 20 (hereinafter referred to as "EGR valve") that controls the amount of exhaust gases that are recirculated. The EGR valve 20 is an electromagnetic valve having a solenoid. A valve opening of the EGR valve 20 is controlled by the ECU 4. The exhaust gas recirculation passage 9 and the EGR valve 20 form the exhaust gas recirculation mechanism.

Each cylinder of the engine 1 is provided with a cylinder pressure sensor 2 for detecting a cylinder pressure (a pressure in the combustion chamber of the engine 1). In this embodiment, the cylinder pressure sensor 2 is configured in one body together with a grow plug disposed in each cylinder. The detection signal of the cylinder pressure sensor 2 is supplied to the ECU 4. It is to be noted that the detection signal of the cylinder pressure sensor 2 corresponds to a differential signal of the cylinder pressure PCYL with respect to the crank angle (time). The cylinder pressure PCYL is obtained by integrating the output of the cylinder pressure sensor.

The engine 1 is provided with a crank angle position sensor 3 for detecting a rotation angle of the crankshaft (not shown) of the engine 1. The crank angle position sensor 3 generates one pulse at every 1 degree of the crank angle, and the pulse is supplied to the ECU 4. The crank angle position sensor 3 further generates a cylinder discrimination pulse at a predetermined crank angle for a specific cylinder of the engine 1, and then supplies the cylinder discrimination pulse to the ECU 4.

An accelerator sensor 21 for detecting an operation amount AP of the accelerator pedal of the vehicle driven by the engine 1, a coolant temperature sensor for detecting a coolant temperature TW of the engine 1, and an intake air temperature sensor 23 for detecting an intake air temperature TA of the engine 1 are connected to the ECU 4. The detection signals of these sensors are supplied to the ECU 4.

The ECU 4 provides a control signal of the fuel injection valve 6 located in the combustion chamber of each cylinder of the engine 1 to a drive circuit 5. The drive circuit 5 is connected to the fuel injection valves 6 and supplies drive signals according to the control signal from the ECU 4 to the fuel injection valves 6. Fuel is injected into the combustion chamber of each cylinder based on a fuel injection timing in accordance with a control signal that is output by the ECU 4. The amount of fuel that is injected is controlled to a value in accordance with the control signal from the ECU 4.

The ECU 4 includes an amplifier 10, an A/D conversion block 11, a pulse generation block 13, a CPU 14 (Central Processing Unit), a ROM 15 (Read Only Memory) for storing programs executed by the CPU 14, a RAM 16 (Random Access Memory) for storing calculation results and the like, an input circuit 17, and an output circuit 18. The detection signal of the cylinder pressure sensor 2 is input to the amplifier 10. The amplifier 10 amplifies the input signal. The signal amplified by the amplifier 10 is then input to the A/D conversion block 11. The pulse signal output from the crank angle position sensor 3 is input to the pulse generation block 13.

The A/D conversion block 11, which includes a buffer 12, converts the cylinder pressure sensor output from the amplifier 10 to a digital value (hereinafter referred to as "pressure change rate") $dp/d\theta$, and stores the converted digital value in the buffer 12. Specifically, a pulse signal PLS1 (hereinafter referred to as "one-degree pulse") having a crank angle period of one degree is supplied to the A/D conversion block 11 from the pulse generation block 13, the cylinder pressure sensor output is sampled at the intervals of the one-degree pulse PLS1 and converted to a digital value, and the digital value is then stored in the buffer 12.

A pulse signal PLS6 having a crank angle period of six degrees is supplied to the CPU 14 from the pulse generation block 13. The CPU 14 performs a process for reading the digital value stored in the buffer 12 at intervals of the six-degree pulse PLS6. That is, in the present embodiment, the A/D conversion block 11 does not request an interrupt from the CPU 14, but the CPU 14 does perform the reading process at intervals of the six-degree pulse PLS6.

The input circuit 17 converts the detection signals from various sensors to digital values, and supplies the digital values to the CPU 14. An engine rotational speed NE is calculated from the time period of the six-degree pulse PLS6. A demand torque TRQ of the engine 1 is calculated according to the operation amount AP of the accelerator pedal.

The CPU 14 calculates a target exhaust gas recirculation amount GEGR (hereinafter referred to as "target EGR amount") according to the engine operating condition, and supplies a duty control signal to the EGR valve 20 through the output circuit 18 for controlling an opening of the EGR valve 20 according to the target exhaust gas recirculation amount GEGR.

Figure 3:
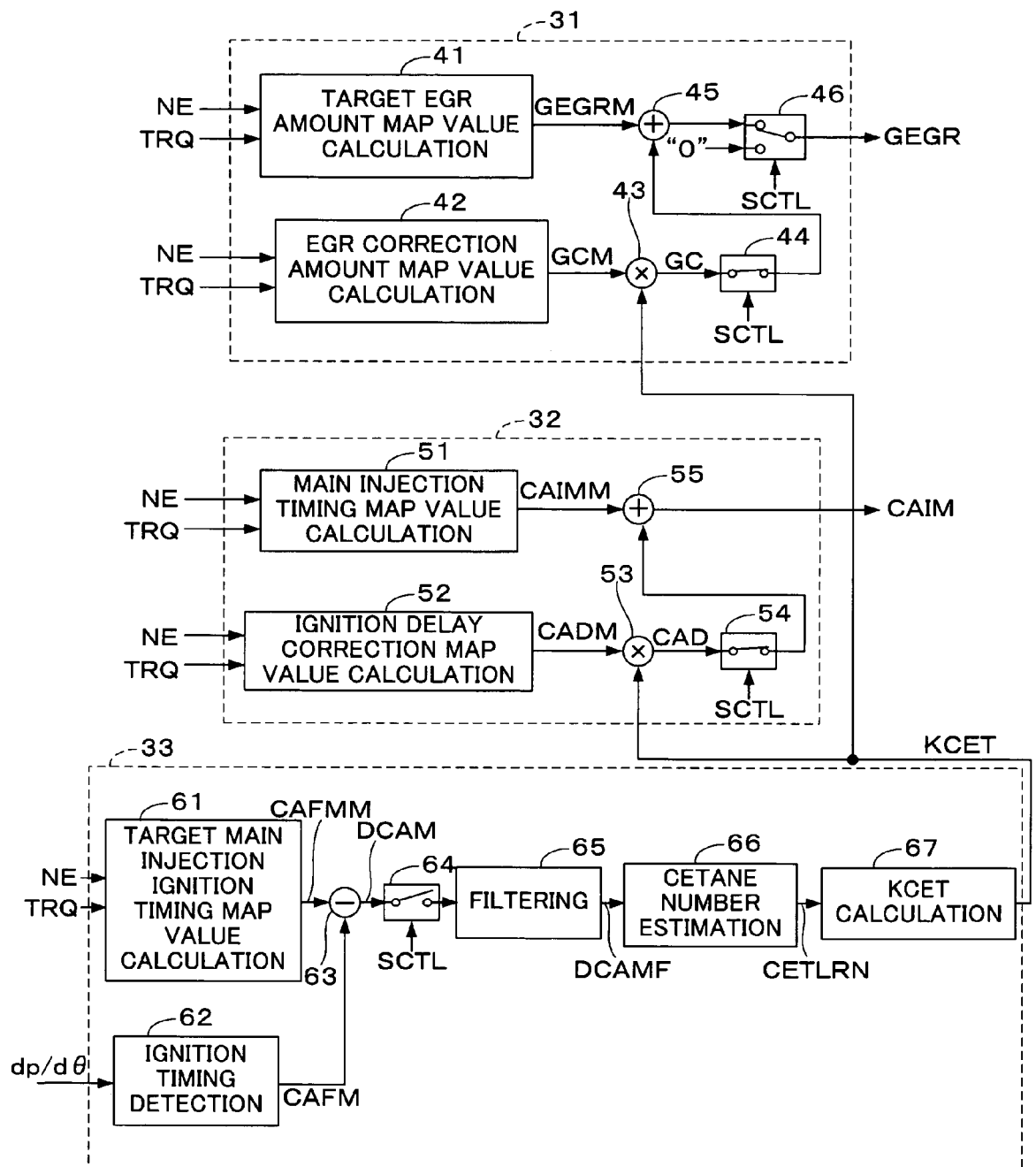
FIG. 3 is a block diagram illustrating a configuration of a module for calculating a target exhaust gas recirculation amount (GEGR) and a main injection timing (CAIM)

FIG. 3 is a block diagram illustrating a configuration of a module which calculates the target EGR amount GEGR and a main injection timing CAIM of the fuel injection valve 6. The function of the module is realized by the processes executed by the CPU 14.

The module of FIG. 3 includes a target EGR amount calculation block 31 for calculating the target EGR amount GEGR, a main injection timing calculation block 32 for calculating the main injection timing CAIM, and a correction coefficient calculation block 33 for estimating a cetane number CET of the fuel being used and calculating a correction coefficient KCET according to the estimated cetane number CET.

The target EGR amount calculation block 31 includes a target EGR amount map value calculation block 41, an EGR correction amount map value calculation block 42, a multiplying block 43, switching blocks 44 and 46, and an adding block 45. The target EGR amount map value calculation block 41 retrieves a GEGRM map, which is previously set according to the engine rotational speed NE and the demand torque TRQ, to calculate a target EGR amount map value GEGRM. The GEGRM map is set based on a fuel of a first cetane number, i.e., a fuel of a high cetane number (e.g., a cetane number close to 57).

The EGR correction amount map value calculation block 42 retrieves a GCM map, which is previously set according to the engine rotational speed NE and the demand torque TRQ, to calculate an EGR correction amount map value GCM. The GCM map is set based on a fuel of a second cetane number, i.e., a fuel of a low cetane number (e.g., a cetane number close to 40), so that the EGR amount may be corrected about 15% or 0.15 degrees per 1 cetane number. The multiplying block 43 multiplies a correction coefficient KCET by the EGR correction amount map value GCM to calculate an EGR correction amount GC. The correction coefficient KCET is calculated according to the cetane number CET of the fuel being used by the correction coefficient calculation block 33.

Figure 4:
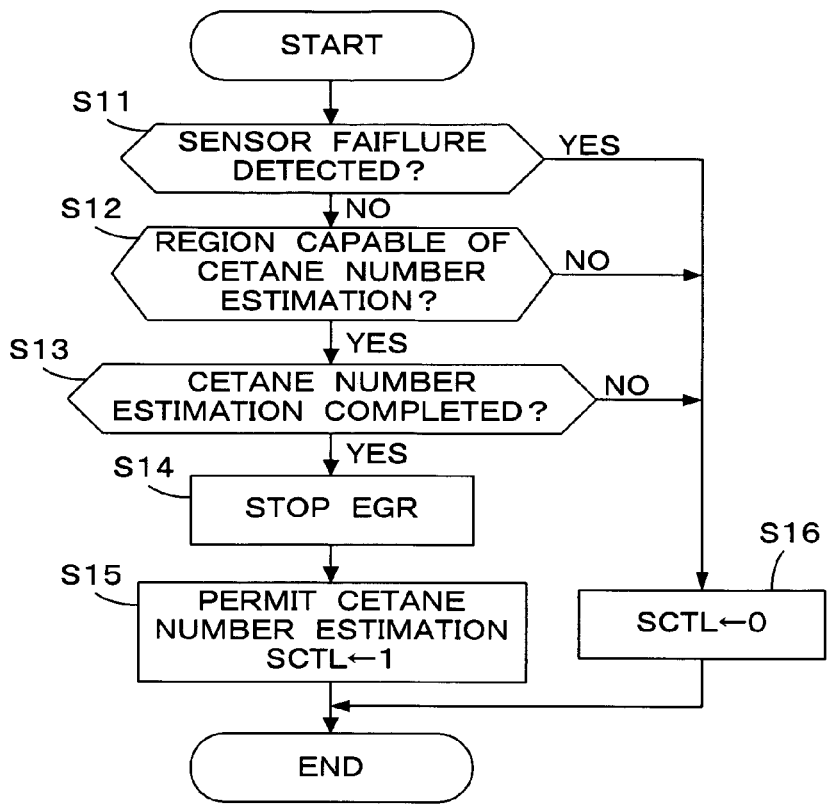
FIG. 4 is a flowchart illustrating a process for setting a switching control signal (SCTL) supplied to a switching block illustrated in FIG. 3.

The adding block 45 adds the EGR correction amount GC to the target EGR amount map value GEGRM to calculate the target EGR amount GEGR. The switching blocks 44 and 46 are supplied with a switching control signal SCTL. When the switching control signal SCTL is low ("0"), the switching block 44 maintains the ON state, as illustrated in FIG. 3, and the switching block 46 selects the output of the adding block 45. The switching control signal SCTL is set to "1" when the estimation process, which is illustrated in FIG. 4, of a cetane number of the fuel being used is executed. Otherwise, the switching control signal SCTL is set to "0". Therefore, when executing the cetane number estimation process, the switching block 44 is turned off, and the switch block 46 selects the input of "0" (which means the full closure of the EGR valve). Accordingly, the exhaust gas recirculation is stopped while executing the cetane number estimation process.

In step S11 of FIG. 4, it is determined whether any sensors (i.e., the crank angle position sensor 3, the accelerator sensor 21, and/or the cylinder pressure sensor 2), necessary for the cetane number estimation process, have failed. If the answer to step S11 is affirmative (YES), the switching control signal SCTL is set to "0" (step S16). If no failure of the sensors is detected, it is determined whether the engine operating condition is in a predetermined operating region (for example, a region where the engine rotational speed NE is within the range from 1000 to 3000 rpm, and the demand torque TRQ is within the range from 0 to 250 Nm) in which the cetane number estimation can be performed (step S12). If the answer to step S12 is negative (NO), the process proceeds to step S16 described above. If the engine operating condition is in the predetermined operating region, it is determined whether the cetane number estimation is completed (step S13). Since the answer to step S13 is negative (NO) at first, the exhaust gas recirculation is stopped (step S14) to permit the cetane number estimation process to occur, i.e., the switching control signal SCTL is set to "1" (step S15). Thereafter, when the estimation process is completed, the process proceeds to step S16 from step S13.

Figure 9A:
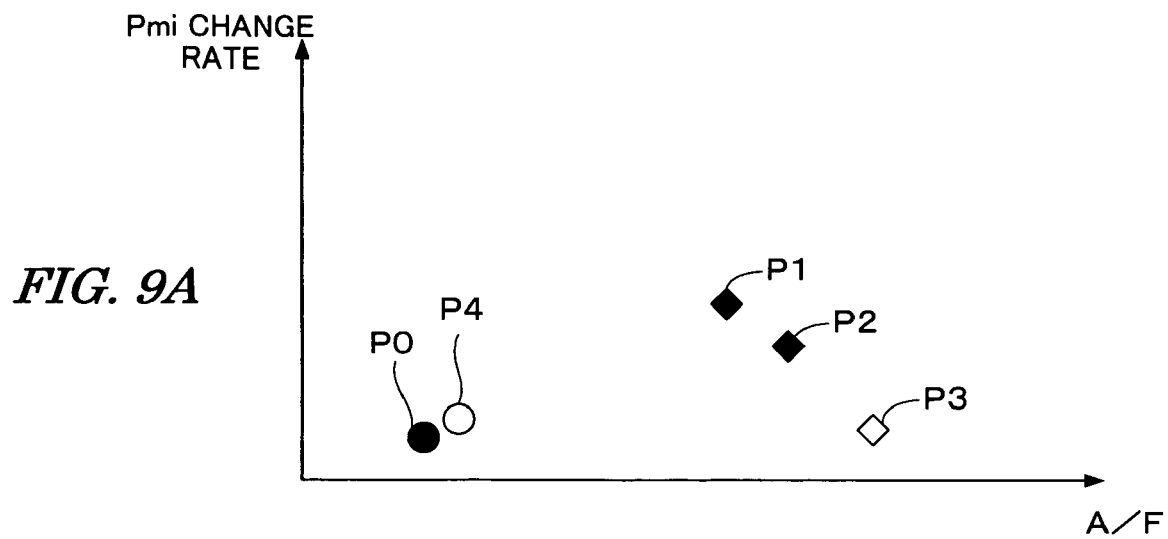
FIGS. 9A and 9B are graphs used to explain the reason for stopping exhaust gas recirculation.

Next, the reason for stopping the exhaust gas recirculation is described below with reference to FIGS. 9A and 9B. FIG. 9A illustrates a relationship between the air-fuel ratio A/F and the rate of change in the indicated mean effective pressure Pmi (hereinafter referred to as "Pmi change rate"). The point P0 shown in FIG. 9A indicates a normal operating condition, and the points P1 and P2 indicate an operating condition in which the exhaust gas recirculation is performed and the Pmi change rate has increased. In the operating condition of the point P1 or P2, the ignition timing cannot accurately be detected, and consequently, the cetane number cannot accurately be estimated.

If the exhaust gas recirculation is stopped in the condition of the point P1 or P2, the operating condition shifts to the operating condition indicated by the point P3. That is, the air-fuel ratio changes toward a leaner air-fuel ratio, and the Pmi change rate decreases to a level of the normal operating condition. In the operating condition indicated by the point P3, the cetane number can be accurately estimated. Therefore, in the present embodiment, the exhaust gas recirculation is stopped when the execution condition of the cetane number estimation is satisfied. Also, the Pmi change rate may be reduced to the normal level by reducing the recirculation amount of exhaust gases instead of stopping the exhaust gas recirculation. Therefore, the recirculation amount of exhaust gases may be reduced instead of stopping the exhaust gas recirculation when the execution condition of the cetane number estimation is satisfied. The point P4 shown in FIG. 9A indicates an operating condition when correcting the fuel injection timing according to the estimated cetane number CET.

Figure 9B:
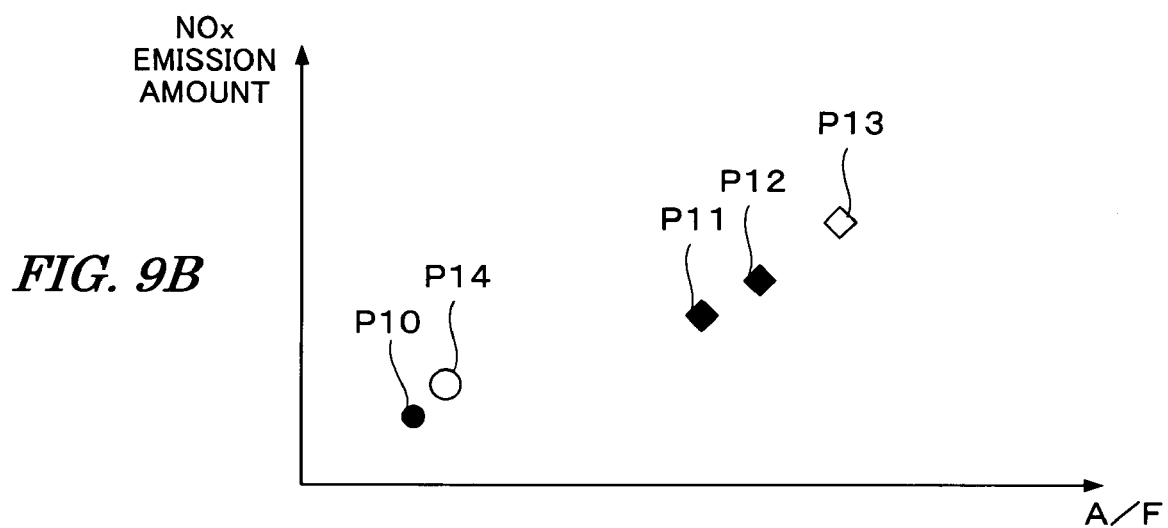

Further, FIG. 9B illustrates a relationship between an emission amount of NOx and the air-fuel ratio A/F. The operating conditions corresponding to those indicated by the points P0–P4 shown in FIG. 9A are indicated by the points P10–P14 in FIG. 9B. By stopping the exhaust gas recirculation, the points P11 and P12 shift to the point P13 and the emission amount of NOx temporarily increases. However, the emission amount of NOx can be reduced to the normal level (i.e., the point P14) by correcting the fuel injection timing and restarting the exhaust gas recirculation after completion of the cetane number estimation process.

Returning back to FIG. 3, the main injection timing calculation block 32 includes a main injection timing map value calculation block 51, an ignition delay correction map value calculation block 52, a multiplying block 53, a switching block 54, and an adding block 55. The main injection timing map value calculation block 51 retrieves a CAIMM map, which is previously set according to the engine rotational speed NE and the demand torque TRQ, to calculate a main injection timing map value CAIMM. The CAIMM map is set based on the above-described fuel of the first cetane number.

The ignition delay correction map value calculation block 52 retrieves a CADM map, which is previously set according to the engine rotational speed NE and the demand torque TRQ, to calculate an ignition delay correction map value CADM. The CADM map is set based on the above-described fuel of the second cetane number so that the correction of about 15% or 0.15 degrees per 1 cetane number is performed. The multiplying block 53 multiplies the correction coefficient KCET calculated in the correction coefficient calculation block 33 by the ignition delay correction map value CADM to calculate an ignition delay correction amount CAD. Like the switching block 44, the switching block 54 is controlled in an on/off manner by the switching control signal SCTL.

The adding block 55 adds the ignition delay correction amount CAD to the main injection timing map value CAIMM by advancing the main injection timing by the ignition delay correction amount CAD to calculate a main injection timing CAIM.

The correction coefficient calculation block 33 includes a target main injection ignition timing map value calculation block 61, an ignition timing detection block 62, a subtracting block 63, a switching block 64, a filtering block 65, a cetane number estimation block 66, and a KCET calculation block 67. The target main injection ignition timing map value calculation block 61 retrieves a CAFMM map, which is previously set according to the engine rotational speed NE and the demand torque TRQ, to calculate a target main injection ignition timing map value CAFMM. The CAFMM map is set based on the above-described fuel of the first cetane number. The ignition timing detection block 62 detects a main injection ignition timing CAFM according to the pressure change rate $dp/d\theta$ which is obtained by converting the output signal of the cylinder pressure sensor 2 to a digital value. The method for detecting the main injection ignition timing will be described later with reference to FIGS. 5–7.

The subtracting block 63 subtracts the detected main injection ignition timing CAFM from the target main injection ignition timing map value CAFMM to calculate an ignition delay angle DCAM. The switching block 64 is controlled in an on/off manner by the switching control signal SCTL. Specifically, the switching block 64 is turned off when the switching control signal SCTL is equal to "0", and turned on when the switching control signal SCTL is equal to "1", which is contrary to the switching block 44 or 54. The filtering block 65 performs a filtering operation by either one of the least-squares calculation method or by moving the averaging calculation of data of the ignition delay angle DCAM obtained in a comparatively long time period (e.g., 10–60 seconds) to calculate a filtered ignition delay angle DCAMF.

The cetane number estimation block 66 converts the ignition delay angle DCAMF to an ignition delay time period TDFM using the engine rotational speed NE, and retrieves a CET table, which is illustrated in FIG. 8, according to the ignition delay time period TDFM to calculate the cetane number CET. The cetane number estimation block 66 applies the cetane number CET to the following equation (1), to calculate a cetane number learning value CETLRN:

$$CETLRN = \alpha \times CET + (1-\alpha) \times CETLRN \qquad (1)$$

where $\alpha$ is an averaging coefficient set to a value between "0" and "1" and the CETLRN on the right side is a preceding calculated value.

When refueling, the cetane number learning value CETLRN is initialized to the minimum value CET0 (for example, 40) among cetane numbers of the fuels distributed in the market, and converges to the value indicative of the cetane number of the fuel in use by the subsequent learning. By initializing to the minimum value CET0, even the fuel of the worst ignitionability (flammability) is therefore ensured of igniting during a cold start of the engine when using the cetane number learning value CETLRN in the fuel injection timing control described below.

The cetane number learning value CETLRN described above is calculated using all of the cylinder pressure sensor outputs corresponding to four cylinders. Therefore, an averaging of the cetane number CET detected for each cylinder and the cetane numbers CET whose detection timings are different from each other is performed using the above-described equation (1). When the cetane number estimation process is not executed, the newest cetane number learning value CETLRN of the stored learning values is output from the cetane number estimation block 66.

The KCET calculation block 67 applies the cetane number learning value CETLRN to the following equation (2) to calculate the correction coefficient KCET.

$$KCET=(CETH-CETLRN)/(CETH-CET0) \quad (2)$$

In the equation (2), CETH is a cetane number (for example, 57) of the high cetane number fuel, which is a reference fuel for setting the above-described CAIMM map and CADM map. Therefore, if the cetane number learning value CETLRN is equal to the reference high cetane number CETH, the correction coefficient KCET is set to "0", and if the cetane number learning value CETLRN is equal to the reference low cetane number CET0, the correction coefficient KCET is set to "1.0".

Figure 5:
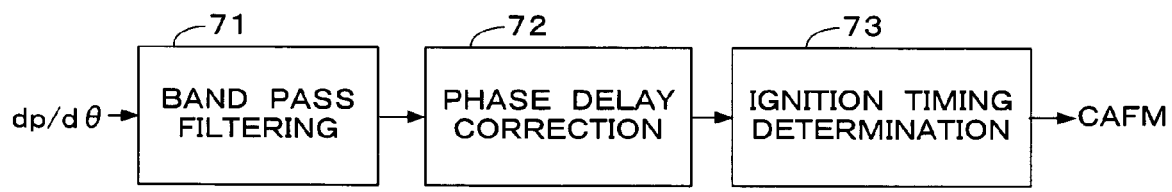
FIG. 5 is a block diagram illustrating a configuration of the ignition timing detection block illustrated in FIG. 3.
Figure 6:
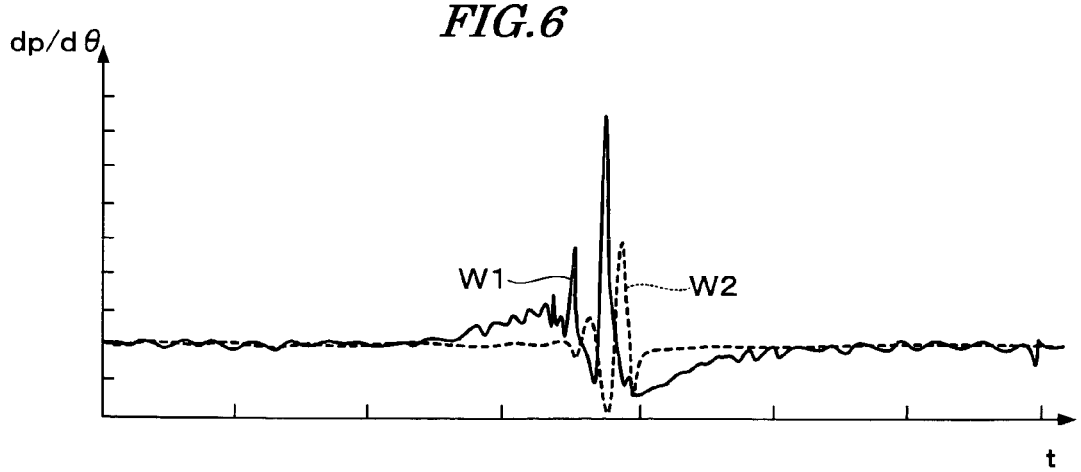
FIG. 6 is a time chart illustrating band pass filtering of a cylinder pressure sensor output.

FIG. 5 is a block diagram showing a configuration of the ignition timing detection block 62. The ignition timing detection block 62 includes a band pass filtering block 71, a phase delay correction block 72, and an ignition timing determination block 73. The pressure change rate dp/dθ output from the cylinder pressure sensor 2 is input to the band pass filtering block 71. In FIG. 6, the waveform W1 illustrates an input waveform, and the waveform W2 illustrates an output waveform. The phase delay occurring in the band pass filtering block 71 is corrected in the phase delay correction block 72.

The ignition timing determination block 73 determines a crank angle position CAFP (hereinafter referred to as "pilot injection ignition timing") where the pressure change rate dp/dθ takes a peak value corresponding to the pilot injection, and a crank angle position CAFM (hereinafter referred to as "main injection ignition timing") where the pressure change rate dp/dθ takes another peak value corresponding to the main injection. Specifically, as shown in FIG. 7C, the crank angle position where the pressure change rate dp/dθ output from the phase delay correction block 72 exceeds a pilot detection threshold value DPP is determined to be the pilot injection ignition timing CAFP, and the crank angle position where the pressure change rate dp/dθ exceeds a main detection threshold value DPM is determined to be the main injection ignition timing CAFM. In this embodiment, only the main injection ignition timing CAFM is used for estimating the cetane number CET.

FIGS. 7A and 7B illustrate a pilot injection pulse INJP started from a crank angle position CAIP and a main injection pulse INJM started from a crank angle position CAIM. FIG. 7C illustrates an angle position range RDET (for example, 10 degrees) where the ignition timings CAFP and CAFM are detected. By limiting the detection angle position range RDET to a comparatively narrow range, as illustrated in FIG. 7C, the ignition timing is accurately determined without increasing the calculation load on the CPU 14.

As described above, the target main injection ignition timing map value CAFMM is calculated according to the engine rotational speed NE and the demand torque TRQ, the main injection ignition timing CAFM is detected, and the ignition delay angle DCAM of the main injection ignition timing CAFM with respect to the target main injection ignition timing map value CAFMM is calculated. Further, the cetane number CET of the fuel is estimated according to the calculated ignition delay angle DCAM, and the learning value CETLRN is calculated. Further, the target EGR amount map value GEGRM is calculated according to the engine rotational speed NE and the demand torque TRQ, and the target EGR amount map value GEGRM is corrected by the correction coefficient KCET, which is set according to the cetane number learning value CETLRN. The control of the recirculation amount of exhaust gases is performed using the corrected target EGR amount GEGR. Therefore, the exhaust gas recirculation is properly performed according to the cetane number of the fuel being used, thereby maintaining a good combustion state and desirable exhaust characteristics.

Further, the exhaust gas recirculation is stopped or the recirculation amount of exhaust gases is reduced without correcting the target EGR amount map value GEGRM when executing the cetane number estimation process. The fuel in use may sometimes be changed by refueling. Therefore, by inhibiting the correction of the EGR amount map value GEGRM until estimation of the cetane number of the fuel currently used is completed, any inaccurate correction of the exhaust gas recirculation amount is prevented.

The fuel injection timing correction amount CAD is calculated using the correction coefficient KCET according to the estimated cetane number, and the main injection timing map value CAIMM is corrected with the fuel injection timing correction amount CAD. Since the ignition delay correction map value CADM, which is calculated based on a low cetane number fuel, is previously set in the CADM map, the fuel injection timing correction amount CAD is calculated by correcting the ignition delay correction map value CADM, which is obtained by retrieving the CADM map, with the correction coefficient KCET. Therefore, the calculation load on the CPU 14 is reduced and controllability improved.

Further, correction using the fuel injection timing correction amount CAD is not performed when executing the cetane number estimation process. Accordingly, any inaccurate correction of the fuel injection timing is prevented.

In the present embodiment, the fuel injection valve 6 corresponds to the fuel injection means, and the crank angle position sensor 3 and the accelerator sensor 21 correspond to the operating condition detecting means. Further, the ECU 4 corresponds to the fuel injection control means, the ignition timing storing means, a part of the ignition timing detecting means, the cetane number estimating means, the exhaust gas recirculation control value storing means, the exhaust gas recirculation control means, the correction means, the fuel injection timing storing means, the ignition delay correction value storing means, and the fuel injection timing correction amount calculating means.

Specifically, the GEGRM map corresponds to the exhaust gas recirculation control value storing means, the CAIMM map corresponds to the fuel injection timing storing means, the CADM map corresponds to the ignition delay correction value storing means, and the CAFMM map corresponds to the ignition timing storing means. The cylinder pressure sensor 2 and the ignition timing detection block 62 correspond to the ignition timing detecting means. The cetane number estimation block 66 corresponds to the cetane number estimating means. The EGR correction amount map value calculation block 42, the multiplying block 43, the switching block 44, the adding block 45, and the KCET calculation block 67 correspond to the correction means, and a control duty calculation block (not shown) for driving the EGR valve 20 corresponds to the exhaust gas recirculation control means. Further, the ignition delay correction map value calculation block 52, the multiplying block 53, the switching block 54, and the KCET calculation block 67 correspond to the fuel injection timing correction amount calculating means, and the main injection timing map value calculation block 51 and the adding block 55 correspond to the fuel injection control means.

According to another embodiment of the present invention, the cetane number of the fuel in use is determined to be any one of a first cetane number CET1 (for example, 57), a second cetane number CET01 (for example, 40), a third cetane number CET02 (for example, 46), or a fourth cetane number CET03 (for example, 51), contemplating the cetane numbers of the fuels distributed in the market. Then the fuel injection timing control is performed according to the determined cetane number. Specifically, the cetane number switching signal SWCET is generated according to the cetane number learning value CETLRN and the correction of the fuel injection timing is performed according to the cetane number switching signal SWCET. The cetane number switching signal SWCET takes values of "4", "1", "2", and "3" corresponding to the first, second, third, and fourth cetane numbers CET1, CET01, CET02, and CET03. The presently described second embodiment is similar to the first embodiment except for the points described below.

Figure 10:
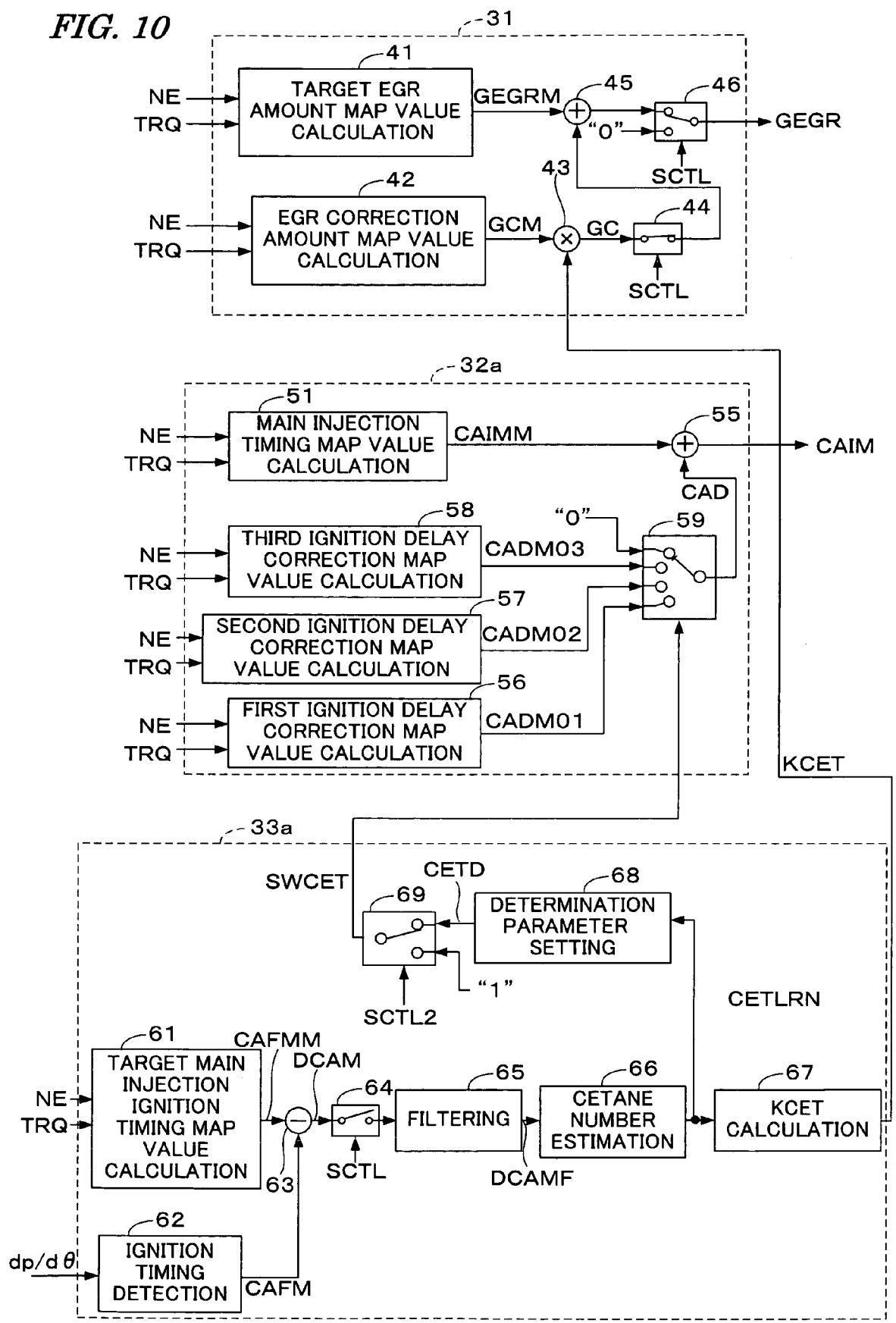
FIG. 10 is a block diagram illustrating a configuration of a module for calculating a target exhaust gas recirculation amount (GEGR), and a main injection timing (CAIM) according to another embodiment of the present invention.

FIG. 10 is a block diagram illustrating a configuration of a module which calculates the target exhaust gas recirculation amount (GEGR) and the main injection timing (CAIM) according to the second embodiment of the present invention.

The target EGR amount calculation block 31 of FIG. 10 is the same as that of the first embodiment illustrated in FIG. 3. Instead of the ignition delay correction map value calculation block 52, the multiplying block 53, and the switching block 54 illustrated in FIG. 3, the injection timing calculation block 32a includes a first ignition delay correction map value calculation block 56, a second ignition delay correction map value calculation block 57, a third ignition delay correction map value calculation block 58, and a switching block 59.

The first ignition delay correction map value calculation block 56 retrieves a CADM01 map, which is set based on the fuel of the second cetane number CET01 (for example, 40), according to the engine rotational speed NE and the demand torque TRQ to calculate a first ignition delay correction map value CADM01. The second ignition delay correction map value calculation block 57 retrieves a CADM02 map, which is set based on the fuel of the third cetane number CET02 (for example, 46), according to the engine rotational speed NE and the demand torque TRQ to calculate a second ignition delay correction map value CADM02. The third ignition delay correction map value calculation block 58 retrieves a CADM03 map, which is set based on the fuel of the third cetane number CET03 (for example, 51), according to the engine rotational speed NE and the demand torque TRQ to calculate a third ignition delay correction map value CADM03.

The switching block 59 selects any one of the ignition delay correction map values CADM01–CADM03, or "0" according to the cetane number switching signal SWCET. Specifically, if SWCET is equal to "4", "0" is selected, if SWCET is equal to "1", the first ignition delay correction map value CADM01 is selected, if SWCET is equal to "2", the second ignition delay correction map value CADM02 is selected, and if SWCET is equal to "3", the third ignition delay correction map value CADM03 is selected. The selected correction amount is then output as the fuel injection timing correction amount CAD. It is not necessary to correct the main injection timing map value CAIMM when the cetane number of the fuel being used is the first cetane number CET1. Accordingly, "0" is selected. Since the ignition delay correction amount increases as the cetane number of the fuel decreases, the relationship of CADM01>CADM02>CADM03 is satisfied when the engine operating condition is the same.

The adding block 55 adds the fuel injection timing correction amount CAD to the main injection timing map value CAIMM to calculate the main injection timing CAIM.

The correction coefficient calculation block 33a includes the same blocks as the correction coefficient calculation block 33 illustrated in FIG. 3, and further includes a determination parameter setting block 68 and a switching block 69.

The determination parameter setting block 68 determines whether the cetane number of the fuel being used is the first cetane number CET1, the second cetane number CET01, the third cetane number CET02, or the fourth cetane number CET03 based on the cetane number learning value CETLRN. When the determined cetane number is the first cetane number CET1, a determined cetane number parameter CETD is set to "4". The determined cetane number parameter CETD is set to "1" when the determined cetane number is the second cetane number CET01. Likewise, the determined cetane number parameter CETD is set to "2" when the determined cetane number is the third cetane number CET02. Finally, the determined cetane number parameter CETD is set to "3" when the determined cetane number is the fourth cetane number CET03.

Figure 12:
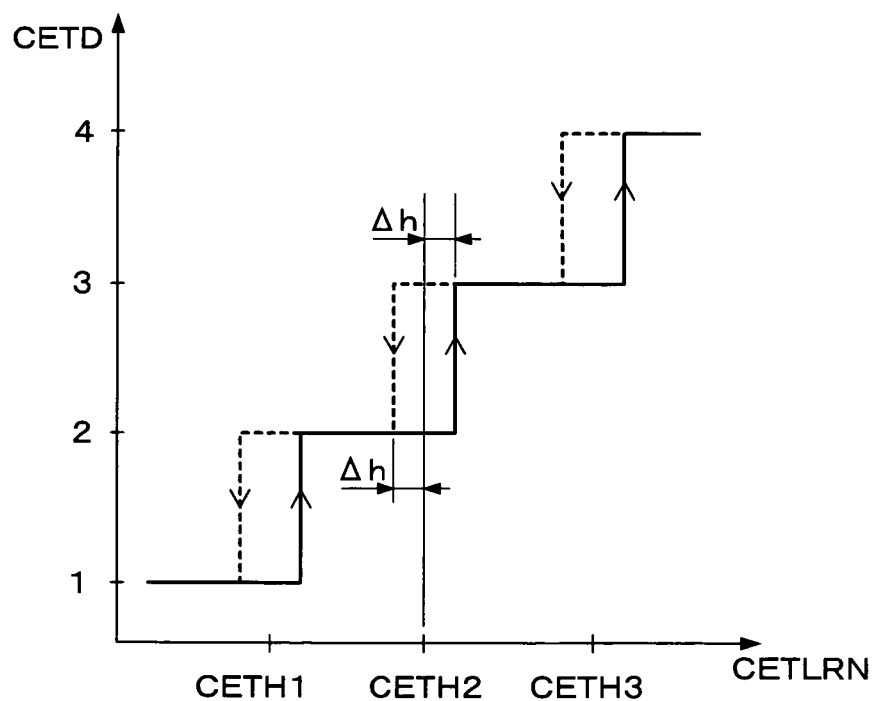
FIG. 12 is a graph illustrating a method for setting a determined cetane number parameter (CETD).

Specifically, as illustrated in FIG. 12, the cetane number learning value CETLRN is compared with first, second, and third threshold values CETH1, CETH2, and CETH3 with the hysteresis. That is, if a parameter (hereinafter referred to as "hysteresis parameter") for adding the hysteresis is indicated by "Δh", the determined cetane number parameter CETD is changed to "3" when the determined cetane number parameter CETD is equal to "2" and the cetane number learning value CETLRN exceeds the value obtained by adding the hysteresis parameter Δh to the second threshold value CETH2. Further, the determined cetane number parameter CETD is changed to "2" when the determined cetane number parameter CETD is equal to "3" and the cetane number learning value CETLRN becomes lower than the value obtained by subtracting the hysteresis parameter Δh from the second threshold value CETH2. With respect to the first and third threshold values CETH1 and CETH3, a similar determination is made to set the determined cetane number parameter CETD.

The switching block 69 is switched by a second switching control signal SCTL2, which is set in the process of FIG. 11 described below. In the switching block 69, if the second switching control signal SCTL2 is "0", "1" is selected, while if the second switching control signal SCTL2 is "1", the determined cetane number parameter CETD is selected. The selected parameter is output as the cetane number switching signal SWCET.

Figure 11:
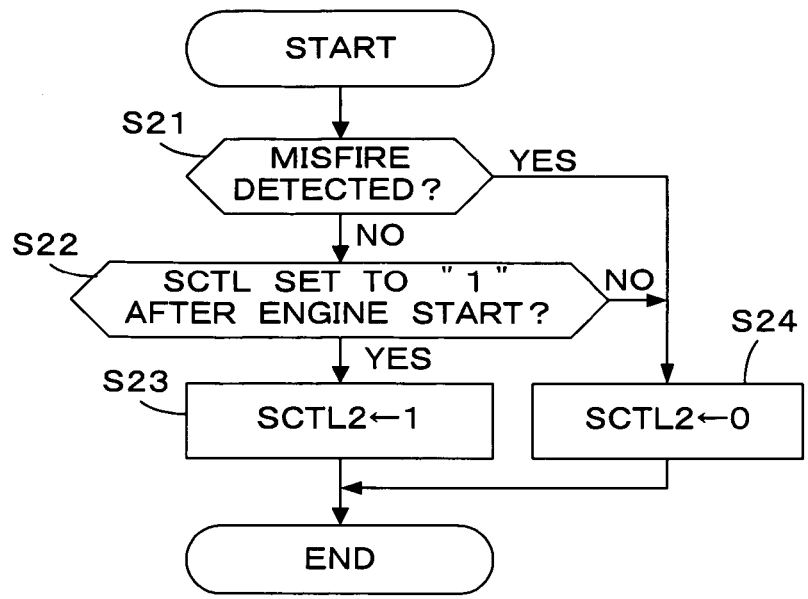
FIG. 11 is a flowchart illustrating a process for setting a switching control signal for the switching block illustrated in FIG. 10.

FIG. 11 is a flowchart of a process for setting the second switching control signal SCTL2.

In step S21, it is determined whether a misfire of the engine 1 is detected. The misfire detection is performed as follows in this embodiment: A maximum value (hereinafter referred to as "maximum pressure change rate") DPMAX of the pressure change rate dp/dθ obtained from the output of the cylinder pressure sensor is detected, a predetermined ratio RTH (for example, 0.6) is multiplied by a preceding value of the maximum pressure change rate DPMAX to calculate a change rate threshold value DPMAXTH, and it is determined whether the maximum pressure change rate DPMAX is less than the change rate threshold value DPMAXTH. Next, a ratio (hereinafter referred to as "error ratio") RERR of a number of times that the maximum pressure change rate DPMAX is less than the change rate threshold value DPMAXTH, with respect to the total number of times of the determination, is calculated. Then, it is determined that a misfire has occurred if the error ratio RERR exceeds a determination threshold value RERRTH (for example, 0.1).

The method for determining the misfire is not limited to the above-described method. Alternatively, an engine rotational speed change parameter indicative of a change in the engine rotational speed may be calculated, and it may be determined that a misfire has occurred when the engine rotational speed change parameter exceeds a predetermined threshold value.

If a misfire is detected, the process proceeds from step S21 to step S24, in which the second switching control signal SCTL2 is set to "0". If no misfire is detected, it is determined whether the switching control signal SCTL1 has been set to "1" after the engine (step S22) has started. If the answer to step S22 is negative (NO), the process proceeds to step S24. If the answer to step S22 is affirmative (YES), the second switching control signal SCTL2 is set to "1".

When the second switching control signal SCTL2 is "0", the cetane number switching signal SWCET is maintained at "1". Accordingly, the first ignition delay correction map value CADM01 is applied. That is, when a misfire occurs, or when the cetane number estimation process has not been executed at all after starting of the engine, the control corresponding to the fuel of the lowest cetane number is performed. Thereby, a significant delay of the fuel injection timing, or a misfire is prevented.

In this embodiment, the CADM01 map, the CADM02 map, and the CADM03 map correspond to the ignition delay correction value storing means. The first, second, and third ignition delay correction map value calculation blocks 56, 57, and 58, the switching block 59, the determination parameter setting block 68, and the switching block 69 correspond to the fuel injection timing correction amount calculating means. 25

The present invention is not limited to the embodiments described above, and various modifications may be made thereto. For example, in the above-described embodiments, the cetane number is estimated based on the main injection ignition timing CAFM corresponding to the main injection. Alternatively, the cetane number estimation may be performed based on the pilot injection ignition timing CAFP corresponding to the pilot injection. Further, the pilot injection timing may be corrected according to the estimated cetane number.

In the above-described first embodiment, the GEGRM map and the CAIMM map are set based on the fuel of a high cetane number, and the GCM map and the CADM map are set based on the fuel of a low cetane number. Conversely, the GEGRM map and the CAIMM map may be set based on the fuel of a low cetane number, and the GCM map and the CADM map may be set based on the fuel of a high cetane number.

Further, in the above-described embodiments, the cylinder pressures in all cylinders are detected to calculate the cetane number learning value CETLRN. Alternatively, only one cylinder pressure sensor may be disposed at a specific cylinder, and the cetane number learning value CETLRN may be calculated based on the cylinder pressure (pressure change rate) detected by the cylinder pressure sensor.

Further, the ignition delay time period TDFM changes depending not only on the cetane number of the fuel but on the deterioration of the fuel injection valve 6. Therefore, it is preferable to correct the ignition delay time period TDFM according to the mileage of the vehicle driven by the engine 1, or an integrated value of the operating time period of the engine 1.

In the above-described embodiment, an example of the 4-cylinder diesel internal combustion engine is shown. The present invention can be applied to a diesel internal combustion engine having another number of cylinders, or a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having fuel injection means provided in a combustion chamber of the engine for injecting fuel into the combustion chamber, and an exhaust gas recirculation mechanism for recirculating exhaust gases of the engine to an intake system of the engine, the control system comprising:

operating condition detecting means for detecting an operating condition of the engine;

fuel injection control means for determining a fuel injection timing according to the detected engine operating condition, and executing a fuel injection through the fuel injection means;

ignition timing storing means for storing at least one target compression ignition timing of the fuel injected into the combustion chamber, each target compression ignition timing being set according to the operating condition of the engine;

ignition timing detecting means for detecting an actual compression ignition timing of the fuel injected into the combustion chamber;

cetane number estimating means for calculating an ignition delay of the actual compression ignition timing with respect to the target compression ignition timing, and estimating a cetane number of the fuel according to the calculated ignition delay;

exhaust gas recirculation control value storing means for storing control values of a recirculation amount of exhaust gases through the exhaust gas recirculation mechanism, the control values being set according to the operating condition of the engine;

exhaust gas recirculation control means for retrieving the control value stored in the exhaust gas recirculation control value storing means according to the detected engine operating condition, and controlling the recirculation amount of exhaust gases using the retrieved control value; and correcting means for calculating a correction amount of the recirculation amount of exhaust gases according to the estimated cetane number, and correcting the control value retrieved from the exhaust gas recirculation control value storing means, wherein the exhaust gas recirculation control means controls the recirculation amount of exhaust gases using the control value corrected by the correcting means.

2. The control system according to claim 1, wherein the correction means stops correcting the control value retrieved from the exhaust gas recirculation control value storing means when the cetane number estimating means is estimating the cetane number.

3. A control system for an internal combustion engine having fuel injection means provided in a combustion chamber of the engine for injecting fuel into the combustion chamber, the control system comprising:

operating condition detecting means for detecting an operating condition of the engine;

fuel injection timing storing means for storing a plurality of timings of fuel injection executed by the fuel injection means, the timings being set according to the operating condition of the engine based on a fuel of a first cetane number;

fuel injection control means for retrieving the fuel injection timing stored in the fuel injection timing storing means according to the detected engine operating condition to determine a fuel injection timing, and executing a fuel injection through the fuel injection means;

ignition timing storing means for storing at least one target compression ignition timing of the fuel injected into the combustion chamber, each target compression ignition timing being set according to the operating condition of the engine based on the fuel of the first cetane number;

ignition timing detecting means for detecting an actual compression ignition timing of the fuel injected into the combustion chamber;

cetane number estimating means for calculating an ignition delay of the actual compression ignition timing with respect to the target compression ignition timing, and estimating the cetane number of the fuel according to the calculated ignition delay;

ignition delay correction value storing means for storing ignition delay correction values corresponding to a case where a fuel of a second cetane number is used, the ignition delay correction values being set according to the operating condition of the engine; and fuel injection timing correction amount calculating means for retrieving the ignition delay correction value stored in the ignition delay correction value storing means according to the detected engine operating condition and calculating a fuel injection timing correction amount based on the retrieved ignition delay correction value and the estimated cetane number, wherein the fuel injection control means corrects the fuel injection timing with the fuel injection timing correction amount, and executes the fuel injection according to the corrected fuel injection timing.

4. The control system according to claim 3, wherein the fuel injection control means stops correcting the fuel injection timing when the cetane number estimating means is estimating the cetane number.

5. A control system for an internal combustion engine having fuel injection means provided in a combustion chamber of the engine for injecting fuel into the combustion chamber, the control system comprising:

operating condition detecting means for detecting an operating condition of the engine;

fuel injection timing storing means for storing timings of fuel injection executed by the fuel injection means, the timings being set according to the operating condition of the engine based on a fuel of a first cetane number;

fuel injection control means for retrieving the fuel injection timing stored in the fuel injection timing storing means according to the detected engine operating condition to determine a fuel injection timing, and executing a fuel injection through the fuel injection means;

ignition timing storing means for storing at least one target compression ignition timing of the fuel injected into the combustion chamber, each target compression ignition timing being set according to the operating condition of the engine based on the fuel of the first cetane number;

ignition timing detecting means for detecting an actual compression ignition timing of the fuel injected into the combustion chamber;

cetane number estimating means for calculating an ignition delay of the actual compression ignition timing with respect to the target compression ignition timing, and estimating the cetane number of the fuel according to the calculated ignition delay;

a plurality of ignition delay correction value storing means corresponding to fuels of different cetane numbers for storing ignition delay correction values corresponding to a case where a fuel of a cetane number lower than the first cetane number is used, the ignition delay correction values being set according to the operating condition of the engine; and fuel injection timing correction amount calculating means for selecting one of the plurality of ignition delay correction value storing means based on the estimated cetane number, retrieving the ignition delay correction value stored in the selected ignition delay correction value storing means according to the detected engine operating condition, and outputting the retrieved ignition delay correction value as a fuel injection timing correction amount, wherein the fuel injection control means corrects the fuel injection timing with the fuel injection timing correction amount and executes the fuel injection according to the corrected fuel injection timing, and the fuel injection timing correction amount calculating means selects the ignition delay correction value storing means that stores ignition delay correction values corresponding to a case where a fuel of a lowest cetane number is used, from the plurality of ignition delay correction value storing means when a misfire of the engine is detected.

6. A control method for an internal combustion engine having at least one fuel injection valve provided in a combustion chamber of the engine for injecting fuel into the combustion chamber, and an exhaust gas recirculation mechanism for recirculating exhaust gases of the engine to an intake system of the engine, the control method comprising the steps of:

a) detecting an operating condition of the engine;

b) determining a fuel injection timing according to the detected engine operating condition;

c) executing a fuel injection through the at least one fuel injection valve;

d) detecting an actual compression ignition timing of the fuel injected to the combustion chamber;

e) calculating an ignition delay of the actual compression ignition timing with respect to a target compression ignition timing which is set according to the engine operating condition;

f) estimating a cetane number of the fuel according to the calculated ignition delay;

g) retrieving an exhaust gas recirculation control value map according to the detected engine operating condition to calculate a control value, the exhaust gas recirculation control value map storing control values of a recirculation amount of exhaust gases through the exhaust gas recirculation mechanism, and being set according to the operating condition of the engine;

h) calculating a correction amount of the recirculation amount of exhaust gases according to the estimated cetane number;

i) correcting the control value retrieved from the exhaust gas recirculation control value map with the calculated correction amount; and j) controlling the recirculation amount of exhaust gases using the corrected control value.

7. The control method according to claim 6, wherein correcting the control value retrieved from the exhaust gas recirculation control value map is stopped when estimating the cetane number of the fuel.

8. A control method for an internal combustion engine having at least one fuel injection valve in a combustion chamber of the engine for injecting fuel into the combustion chamber, the control method comprising the steps of:

a) detecting an operating condition of the engine;

b) retrieving a fuel injection timing map according to the detected operating condition of the engine to determine a fuel injection timing, the fuel injection timing map storing a plurality of timings of fuel injection executed by the at least one fuel injection valve, and being set according to the operating condition of the engine based on a fuel of a first cetane number;

c) executing a fuel injection through the at least one fuel injection valve;

d) detecting an actual compression ignition timing of the fuel injected into the combustion chamber;

e) retrieving an ignition timing map according to the detected operating condition of the engine to calculate a target compression ignition timing, the ignition timing map storing at least one target compression ignition timing of the fuel injected into the combustion chamber, and being set according to the operating condition of the engine based on the fuel of the first cetane number;

f) calculating an ignition delay of the actual compression ignition timing with respect to the retrieved target compression ignition timing;

g) estimating a cetane number of the fuel according to the calculated ignition delay;

h) retrieving an ignition delay correction value map according to the detected operating condition of the engine to calculate an ignition delay correction value, the ignition delay correction value map storing the ignition delay correction values corresponding to a case where a fuel of a second cetane number is used, and being set according to the operating condition of the engine;

i) calculating a fuel injection timing correction amount based on the calculated ignition delay correction value and the estimated cetane number; and j) correcting the fuel injection timing with the fuel injection timing correction amount, wherein the fuel injection is executed according to the corrected fuel injection timing.

9. The control method according to claim 8, wherein the correction of the fuel injection timing is stopped when estimating the cetane number of the fuel.

10. A control method for an internal combustion engine having at least one fuel injection valve in a combustion chamber of the engine for injecting fuel into the combustion chamber, the control method comprising the steps of:

a) detecting an operating condition of the engine;

b) retrieving a fuel injection timing map according to the detected operating condition of the engine to determine a fuel injection timing, the fuel injection timing map storing timings of fuel injection executed by the at least one fuel injection valve, and being set according to the operating condition of the engine based on a fuel of a first cetane number;

c) executing a fuel injection through the at least one fuel injection valve;

d) detecting an actual compression ignition timing of the fuel injected into the combustion chamber;

e) retrieving an ignition timing map according to the detected operating condition of the engine to calculate a target compression ignition timing, the ignition timing map storing target compression ignition timings of the fuel injected to the combustion chamber, and being set according to the operating condition of the engine based on the fuel of the first cetane number;

f) calculating an ignition delay of the actual compression ignition timing with respect to the calculated target compression ignition timing;

g) estimating a cetane number of the fuel according to the calculated ignition delay;

h) selecting one of a plurality of ignition delay correction value maps corresponding to fuels of different cetane numbers, based on the estimated cetane number, the plurality of ignition delay correction value maps storing ignition delay correction values corresponding to a case where a fuel of which cetane number is lower than the first cetane number is used, and being set according to the operating condition of the engine;

i) retrieving the selected ignition delay correction value map according to the detected operating condition of the engine to calculate a fuel injection timing correction amount; and j) correcting the fuel injection timing with the fuel injection timing correction amount, wherein the fuel injection is executed according to the corrected fuel injection timing, wherein the ignition delay correction value map that stores ignition delay correction values corresponding to a case where a fuel of a lowest cetane number is used, is selected from the plurality of ignition delay correction value maps, when a misfire of the engine is detected.

* * * * *